(12) United States Patent
Babcock

(10) Patent No.: US 9,242,792 B2
(45) Date of Patent: *Jan. 26, 2016

(54) GRAIN STORAGE PIT WITH CURVED COVERING GRATE AND ADJUSTABLE UNLOADING TUBE

(76) Inventor: Ken Babcock, Hiawatha, KS (US)

( * ) Notice: Subject to any disclaimer, the term of this patent is extended or adjusted under 35 U.S.C. 154(b) by 592 days.

This patent is subject to a terminal disclaimer.

(21) Appl. No.: 13/603,111

(22) Filed: Sep. 4, 2012

(65) Prior Publication Data

US 2014/0064890 A1 Mar. 6, 2014

(51) Int. Cl.
*B65G 3/04* (2006.01)
*B65D 88/32* (2006.01)
*B65D 90/58* (2006.01)

(52) U.S. Cl.
CPC .............. *B65D 88/32* (2013.01); *B65D 90/585* (2013.01); *B65G 3/04* (2013.01)

(58) Field of Classification Search
CPC .......... B65G 3/04; B65G 65/40; B65G 65/46; B65G 65/466; B65G 67/06
USPC .......................................... 414/303, 304, 305
See application file for complete search history.

(56) References Cited

U.S. PATENT DOCUMENTS

| | | | | | |
|---|---|---|---|---|---|
| 1,676,307 | A | * | 7/1928 | Winter | 49/74.1 |
| 1,796,168 | A | * | 3/1931 | Stair | 52/192 |
| 2,251,990 | A | * | 8/1941 | De Young | 414/572 |
| 2,284,226 | A | * | 5/1942 | Oglesby | 414/303 |
| 3,090,507 | A | * | 5/1963 | Gutekunst et al. | 414/326 |
| 3,417,883 | A | * | 12/1968 | Felts | 414/303 |
| 3,460,722 | A | * | 8/1969 | Jung | 222/410 |
| 4,095,705 | A | * | 6/1978 | Hood | 414/519 |
| 4,330,232 | A | * | 5/1982 | McClaren | 198/306 |
| 4,457,444 | A | * | 7/1984 | Wold | 220/213 |
| 4,529,085 | A | * | 7/1985 | Johnson | 198/532 |
| 5,125,221 | A | * | 6/1992 | Looney | 56/1 |
| 5,178,507 | A | * | 1/1993 | Friesen | 414/326 |
| 5,893,399 | A | * | 4/1999 | Kearney | 141/286 |
| 6,497,545 | B1 | * | 12/2002 | Simrose | 414/310 |
| 6,752,715 | B2 | * | 6/2004 | Stephens et al. | 460/23 |
| 8,109,403 | B2 | * | 2/2012 | Michel | 220/254.1 |
| 8,414,061 | B1 | * | 4/2013 | Greminger | 296/100.18 |
| 8,567,135 | B2 | * | 10/2013 | Babcock | 52/193 |
| 2011/0277404 | A1 | * | 11/2011 | Babcock | 52/195 |

FOREIGN PATENT DOCUMENTS

WO    WO 2012/142676 A1 * 10/2012 ............ B65G 3/04

* cited by examiner

*Primary Examiner* — James Keenan
(74) *Attorney, Agent, or Firm* — Hovey Williams LLP

(57) ABSTRACT

A grain storage pit includes an open-top chamber configured to be substantially flush-mounted in a surface and a grain-receiving grate that covers at least a portion of the open-top chamber so that grain may be poured into the open-top chamber through the grate from a truck positioned over the pit. The grate has a convex-shaped upper surface so that a cover placed over the grate more effectively sheds water. The grain storage pit may also include one or more unloading ports for facilitating removal of grain from the pit. At least one of the unloading ports may be adjustably mounted to an opening in the chamber.

20 Claims, 7 Drawing Sheets

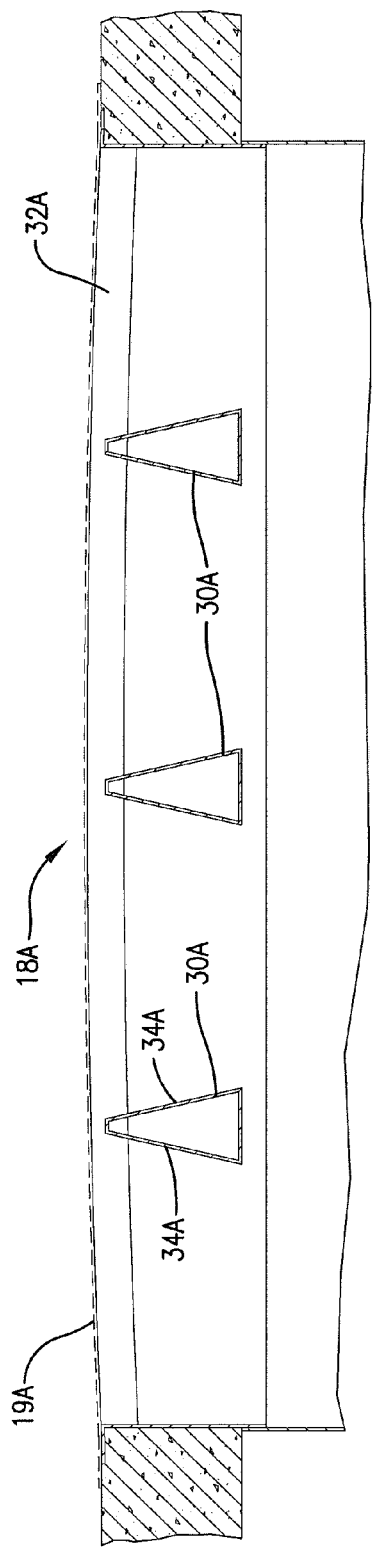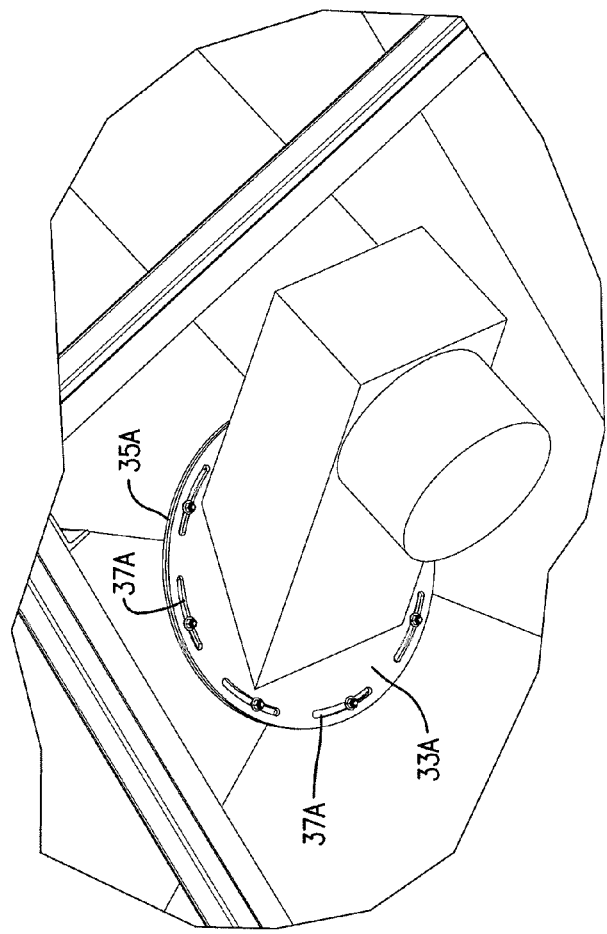

GRAIN STORAGE PIT WITH CURVED COVERING GRATE AND ADJUSTABLE UNLOADING TUBE

BACKGROUND

Corn, wheat, rice, sorghum, millet and other grains are produced on a seasonal basis and therefore must be stored between harvests to meet year-round demand. Grain is typically transported to above-ground storage bins, silos, or other enclosures by trucks or rail cars and lifted into these enclosures by conveyor systems, augers, and other conveying devices. The transfer of the grain from the trucks or rail cars to the above-ground enclosures is time-consuming. Large above-ground grain storage enclosures are also not suitable for installation and use with smaller grain operations.

SUMMARY

The present invention provides a grain storage device that can receive grain directly from a truck, rail car, or other vehicle without the use of conveyor systems, augers, etc. The grain storage device of the present invention is also ideally suited for smaller grain operations and/or in applications with limited installation space.

An embodiment of the invention is a grain storage pit broadly comprising an open-topped chamber, a covering grate, and at least one unloading port. The chamber is configured to be substantially flush-mounted in a surface such as a concrete pad and comprises a number of generally vertically-extending sidewalls, a lower collection area defined by a number of inwardly-sloped bottom walls depending from the vertically-extending sidewalls; and an upper circumferential lip.

The covering grate covers the open top of the chamber and permits grain to be directly poured in the chamber without the need for conveyer systems. Embodiments of the covering grate are configured to control the rate at which grain is deposited in the chamber.

In one embodiment, the grate is curved or arched so as to present a convex-shaped upper surface. A tarp, rubber mat, or other cover may be placed over the grate so as to prevent water and debris from entering the chamber when the grain storage pit is not being loaded with grain. The curved upper surface keeps the cover from drooping in the middle to prevent water from pooling on top of the cover and the grain pit.

The unloading port is in communication with the interior of the chamber for facilitating removal of grain from the chamber. One embodiment of the unloading port is an unloading tube sized and configured for receiving an auger for removing the grain from the chamber. Another embodiment of the unloading port may comprise a port or other opening in the lower collection area for discharging grain from the bottom of the pit.

In one embodiment, the unloading port is adjustably mounted to the bottom of the chamber so that it may be selectively positioned relative to the chamber. The adjustable embodiment of the unloading port may include an elongated tube and a grain collection box. The tube has a lower end connected to the grain collection box and an upper end that extends above the grate. The grain collection box is pivotally coupled with an opening in the bottom of the chamber by a circular flange on the collection box that bolts to a corresponding circular flange on the bottom of the chamber. The two circular flanges include a number of aligned connection slots that receive bolts or other fasteners for fixing the flanges together. The slots permit the flanges to be pivoted or rotated relative to one another when the bolts between the flanges are loosened. This permits the unloading port to be pivoted or rotated relative to the chamber so that the end of the tube that extends above the grate may be positioned on any side of the pit and point in any desired direction.

The storage pit may be installed in an excavated hole surrounded by a concrete pad or other surface. Concrete approaches may be poured around the pit so that trucks may drive directly up to the storage pit and dump or otherwise unload grain into it through the grain-receiving grate. Grain may be subsequently removed from the storage pit with an auger that fits inside the unloading port.

The embodiment of the storage pit with an adjustable unloading tube may be installed adjacent another such storage pit and their adjustable unloading ports may be positioned so as to point toward one another. This permits augers to be positioned in both unloading ports and to unload grain onto a single conveyor positioned between and above the pits.

Embodiments of the storage pit may also be supported in the roof or ceiling of a structure so that trucks may drive on the structure and dump grain into the storage pit and other trucks may drive into the structure and under the storage pit to remove grain from the storage pit. Grain may be discharged from the bottom of the chamber directly into a truck or onto a conveyor or other transport mechanism.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 7 is a sectional view of the grain storage pit of FIG. 6 taken along line 7-7 of FIG. 5.

FIG. 8 is a partial bottom view of the grain storage pit of FIG. 6 depicting the connection of the unloading port to the bottom of the chamber.

Figure 1:
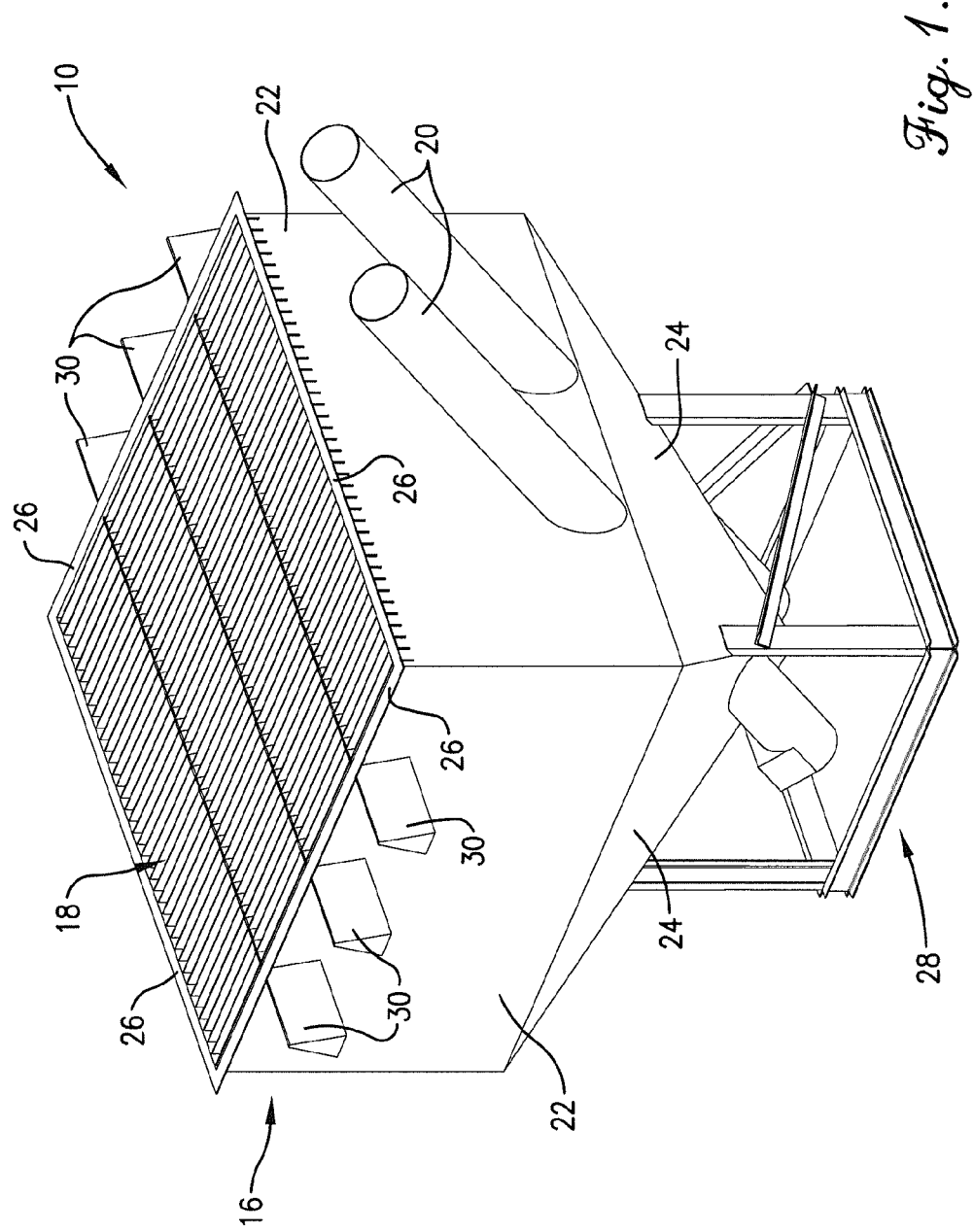
FIG. 1 is a perspective view of a grain storage pit constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
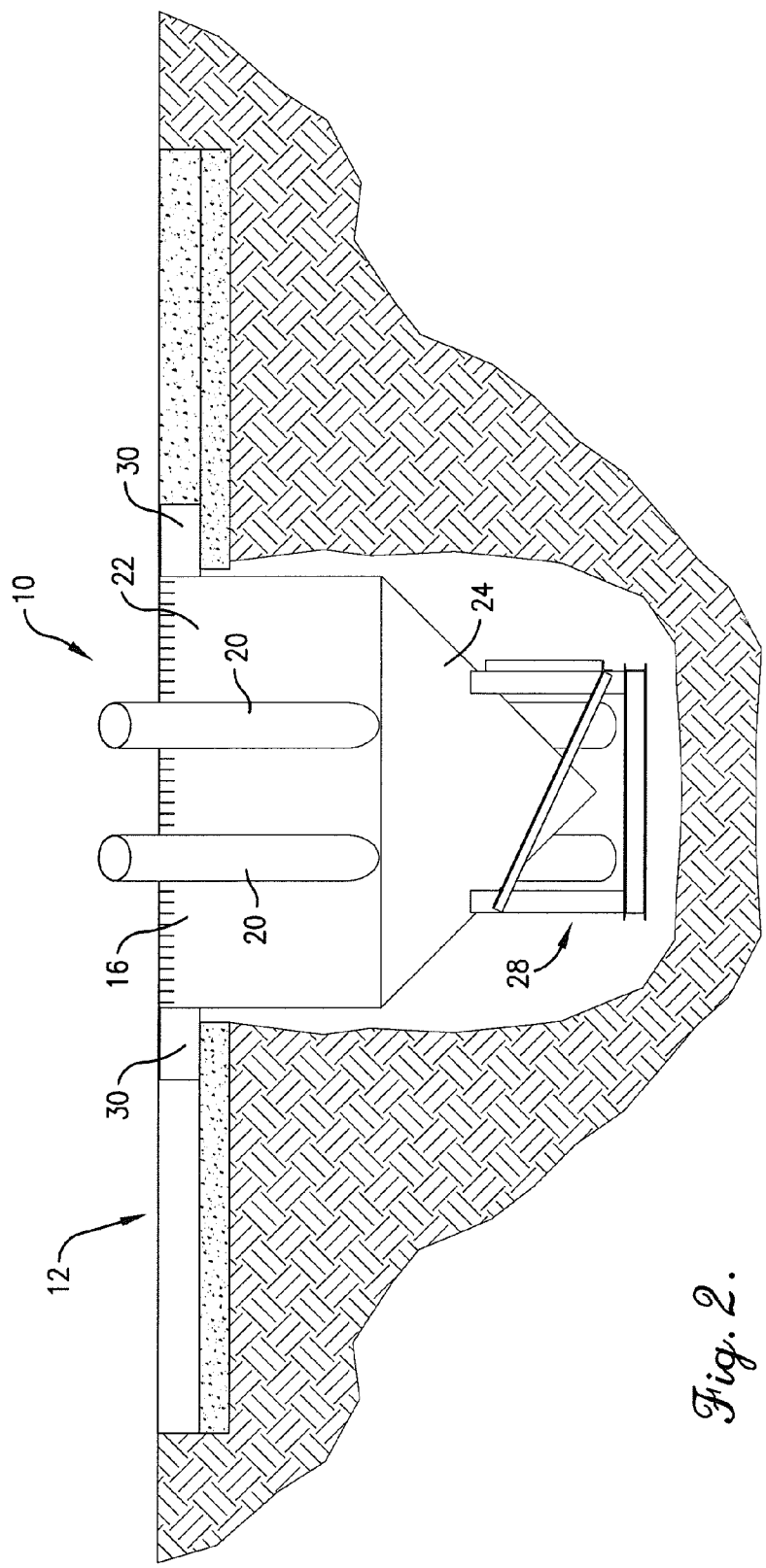
FIG. 2 is an elevational view in partial section depicting installation of the grain storage pit in the ground.
Figure 3:
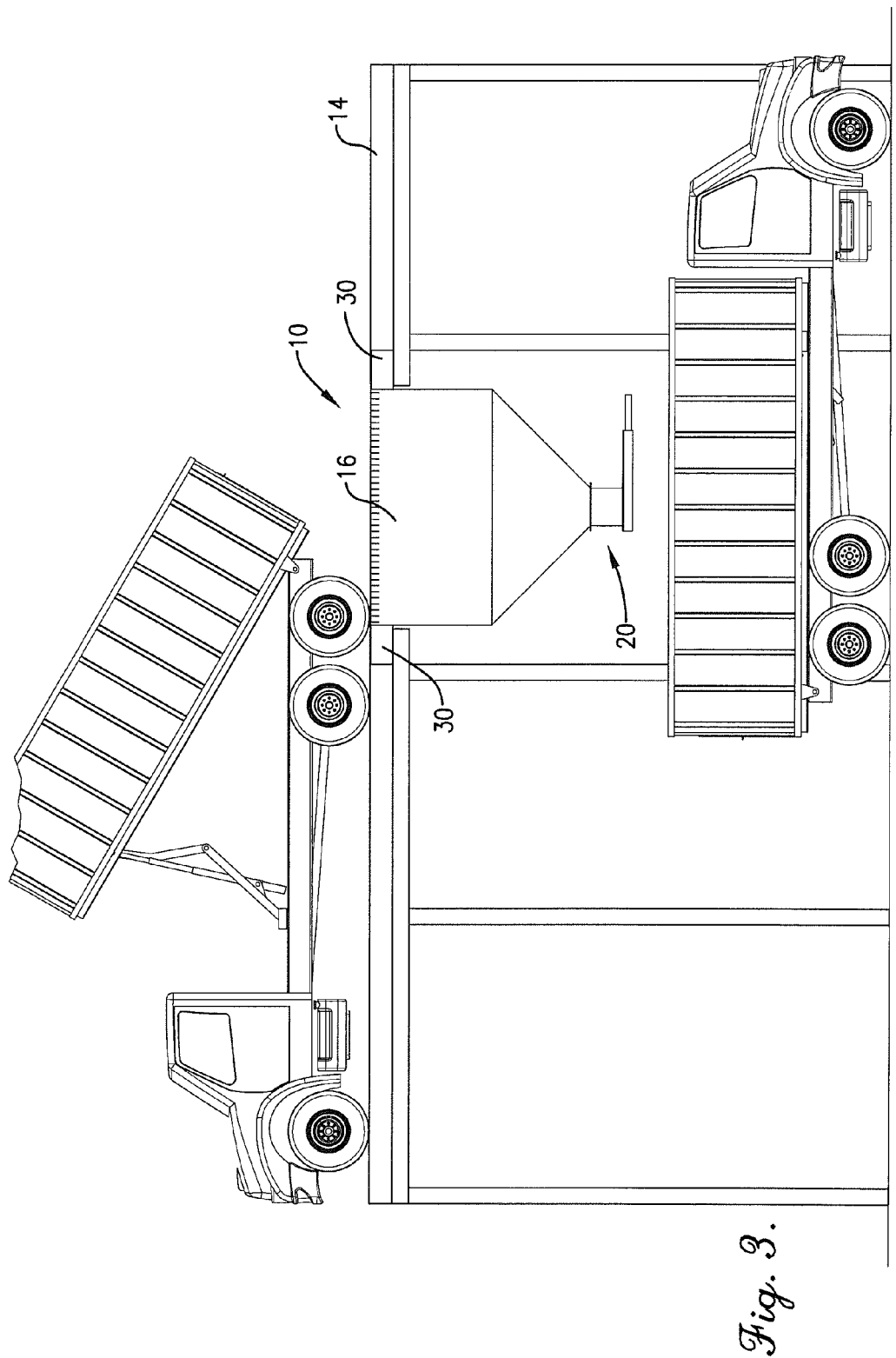
FIG. 3 is an elevational view depicting installation of the grain storage pit in a structure.

Turning now to the drawing figures, and particularly FIG. 1, a grain storage pit 10 constructed in accordance with an embodiment of the invention is illustrated. The grain storage pit 10 may be installed in the ground and substantially flush-mounted in a concrete pad 12 or other surface as depicted in FIG. 2 or installed above a garage, basement, or other structure 14 and substantially flush-mounted in the upper surface of the structure as depicted in FIG. 3. The grain storage pit 10 broadly comprises an open-topped chamber 16, a covering grate 18, and one or more unloading ports 20.

The chamber 16 may be any device capable of holding grain. An embodiment of the chamber 16 comprises four generally vertically-extending sidewalls 22 that form a box-shaped structure with an open top. Four generally triangular-shaped and inwardly-sloping bottom walls 24 depend from the sidewalls and join together at their apexes to define a lower gravity fed collection area within the chamber. Four generally flat bars 26 are attached to or integrally formed with the top edges of the sidewalls 22 to form a square frame or lip around the chamber.

The sidewalls 22 and bottom walls 24 of the chamber are preferably formed of heavy-duty materials such as 3/16" or 1/4" steel and are welded or otherwise attached together. The chamber may be fabricated in any size and shape, and in one embodiment is approximately 10 ft. long, 10 ft. wide, and 4-8 ft. deep. A base 28 formed from several metal frame members and cross supports may be welded or otherwise attached to the bottom of the chamber 16 to support the chamber in an upright position before it is installed. The base 28 may also assist in supporting the storage pit 10 when it is installed in the ground as described in more detail below.

The grate 18 covers the open-top of the chamber 16 and allows grain to be directly poured into the pit from above without the use of conveyor systems, augers, etc. The grate 18 also has structure for controlling the flow of grain into the chamber as described below. The grate also permits people to walk over and vehicles to drive over the pit.

Figure 4:
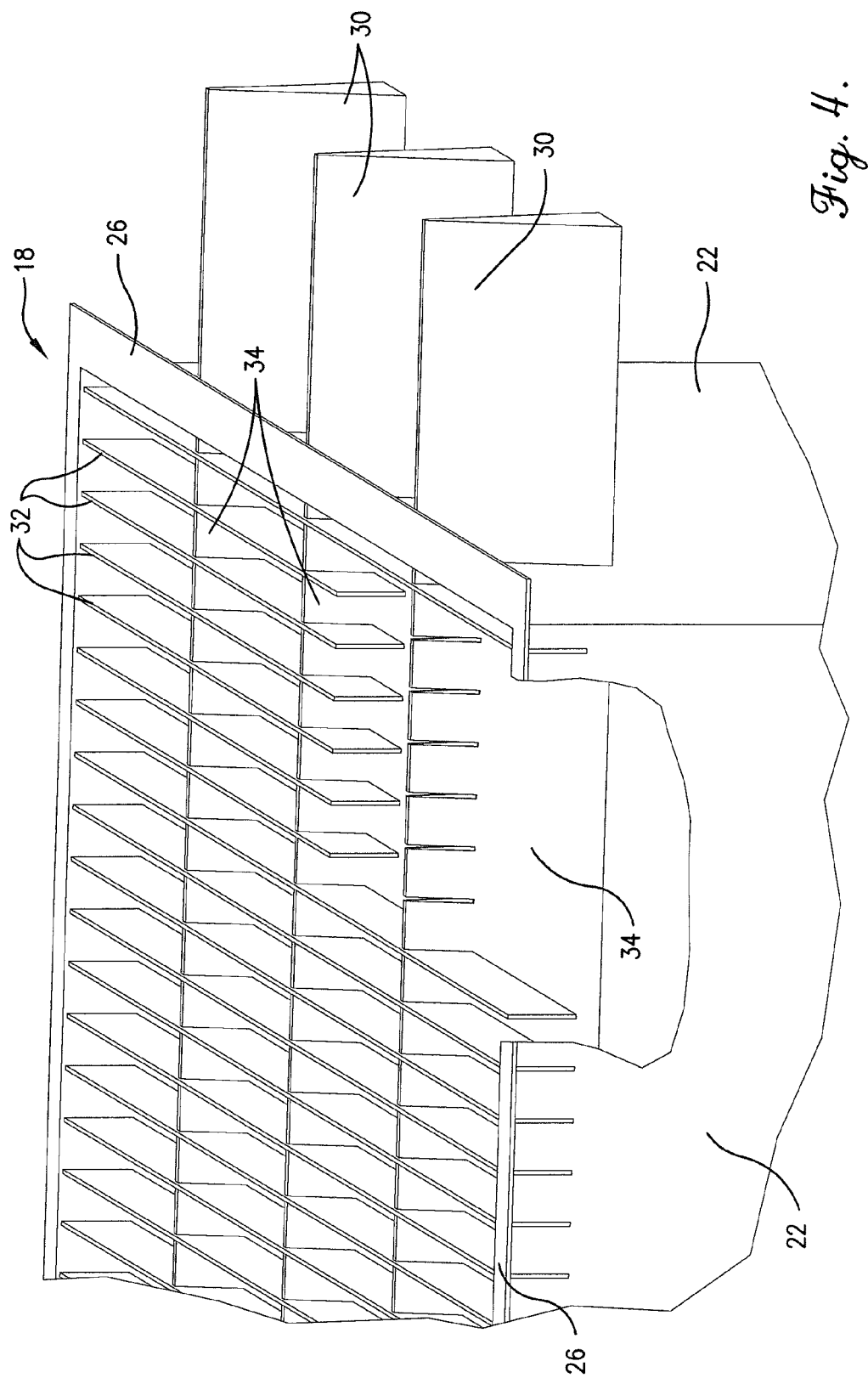
FIG. 4 is a partial perspective view of an embodiment of the covering grate with parts broken away.

An embodiment of the grate 18 is best illustrated in FIGS. 1 and 4 and presents front and rear edges and left and right side edges. The grate may be formed from a number of elongated supports 30 and a plurality of cross treads 32. The supports 30 are triangular in cross section and formed of 0.1875" thick steel or other metal. The triangular shape of the supports provides sloped walls 34 that slow the flow of grain into the pit to prevent damage to the grain. In one embodiment, the sloped walls 34 of each support are approximately 11" long and connected at their lower ends by a base that is approximately 6" wide.

The supports 30 extend lengthwise between the left and right sides of the grate and are longer than the chamber so that the ends of the supports extend beyond the chamber for supporting the pit during installation as described below. For a 10'×10' chamber, the supports are approximately 13' long. Any number of supports may be provided, depending on the size of the chamber and anticipated load on the grate.

As shown in FIG. 4, the portions of the supports 30 inside the boundaries of the chamber 16 are notched to receive and support the cross treads 32. In one embodiment, the notches are spaced approximately 3" apart and are approximately 2" deep.

The cross treads 32 are aligned in the notches of the supports 30 and extend perpendicular to the supports. The cross treads 32 may be formed from elongated steel slats or bars, and in one embodiment are approximately 4" tall and 10' long. The cross treads 32 may extend above the apexes of the supports 30 by an inch or two to provide additional surface area for resisting the flow of grain into the pit.

The unloading ports 20 are in communication with the interior of the chamber 16 and are provided for facilitating removal of grain from the chamber. The storage pit 10 may be provided with any type and number of unloading ports 20.

As shown in FIGS. 1 and 2, an embodiment of the pit 10 comprises two unloading ports 20, each in the form of an elongated unloading tube having one end in communication with the interior of the chamber and an opposite end that extends above the grate 18. Each unloading tube may be approximately 14" in diameter and is configured for receiving an auger for removing the grain from the chamber 16. As shown in FIG. 1, each unloading tube may extend below the lower collection area of the pit so an auger placed therein can remove all of the grain in the chamber. In embodiments where two or more unloading tubes are provided, the tubes may be positioned adjacent one another or along opposite sides of the chamber.

As shown in FIG. 3, the unloading port 20 may also comprise a port or other opening in the lower collection area for discharging grain into a truck below the storage pit 10. The port may have a manually-actuated or powered valve or gate for controlling the discharge of grain from the chamber.

To install the grain pit 10, it is first delivered to an installation site and supported in an upright orientation by its base 28. The pit may be installed on a concrete pad 12 surrounding an excavated hole by lowering the pit into the hole until the ends of the supports 30 rest on the pad and the base 28 touches the bottom of the excavated hole as depicted in FIG. 2. Concrete approaches may then be poured around the pit so as to cover the ends of the supports. This generally flush-mounts the storage pit so that trucks may drive directly up to it and dump or otherwise unload grain into it through the grain-receiving grate 18. Grain may be subsequently removed from the pit with augers that fit inside the unloading tubes 20.

The storage pit 10 may also be supported in the roof or ceiling of a structure 14 so that trucks may drive on the structure and dump grain into the storage pit as depicted in FIG. 3. Other trucks may drive into the structure and under the storage pit to remove grain from the storage pit. Grain may be discharged from the unloading port 20 in the bottom of the chamber 16 directly into the trucks or onto a conveyor or other transport mechanism.

Figure 5:
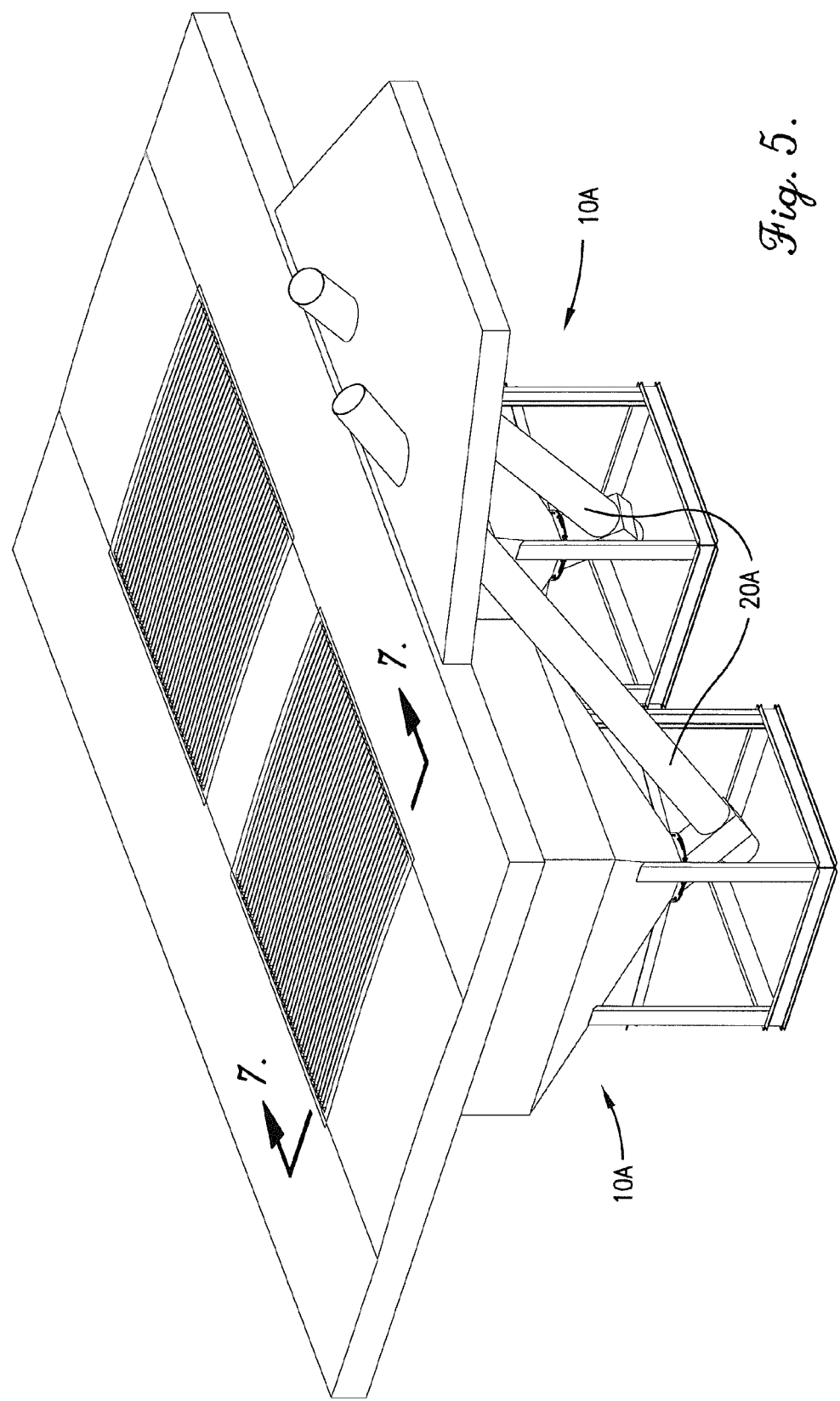
FIG. 5 is a perspective view of a pair of grain storage pits constructed in accordance with another embodiment of the invention and shown mounted flush in a concrete pad.
Figure 6:
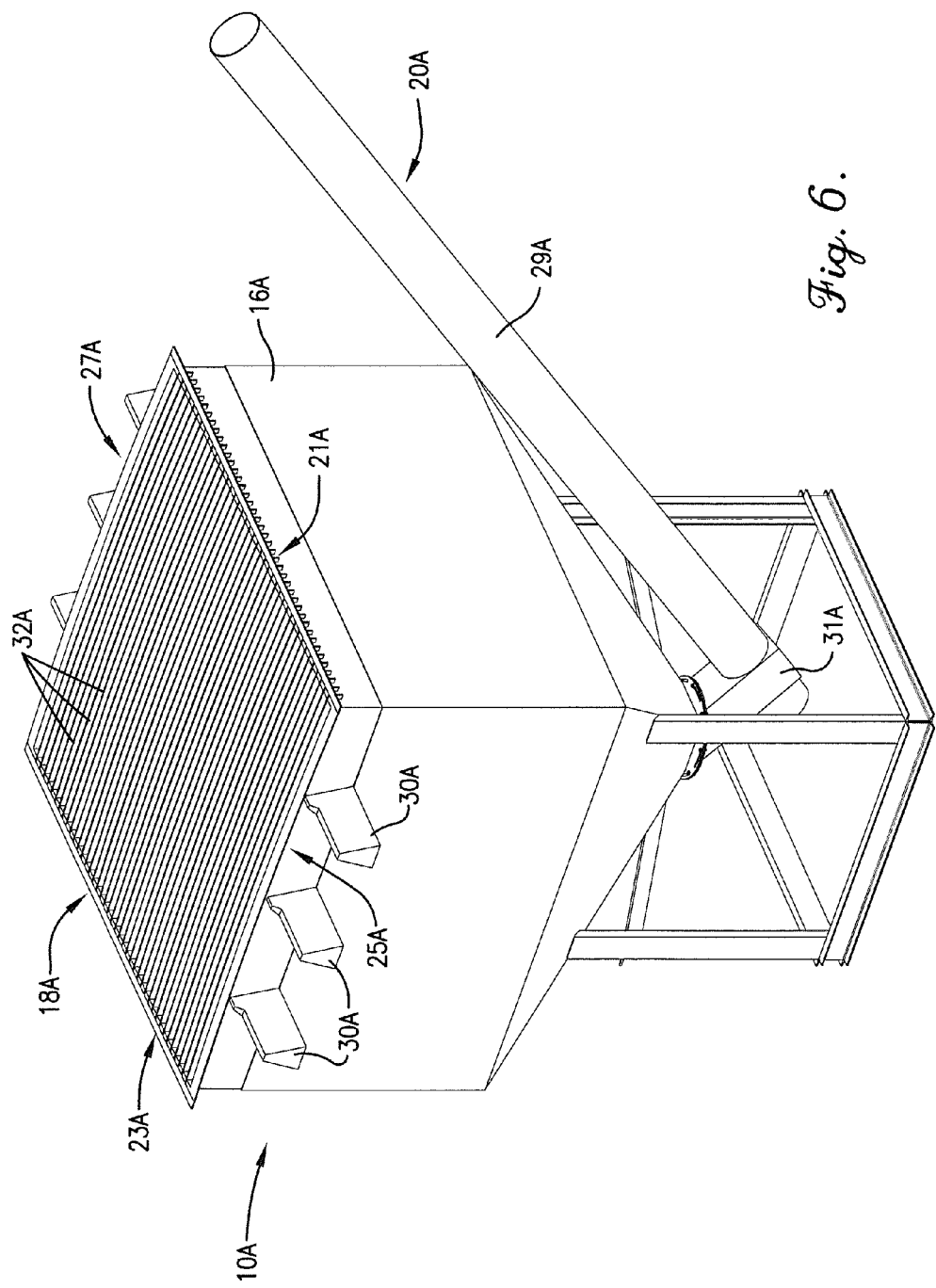
FIG. 6 is a perspective view of one of the grain storage pits of FIG. 5 shown before it is installed in the ground.

A grain storage pit 10A constructed in accordance with another embodiment of the invention is illustrated in FIG. 5-8 and also broadly comprises an open-topped chamber 16A, a covering grate 18A, and one or more unloading ports 20A as best shown in FIG. 6. Many aspects of the grain storage pit 10A are similar to the grain storage pit 10 described above, so similar components are identified by the same reference numerals followed by the letter A. Only those components of the grain storage pit 10A that differ from the grain storage pit 10 are described in detail herein.

In accordance with one important aspect of the grain storage pit 10A, the grate 18A is curved or arched so as to present a convex-shaped upper surface as best seen in FIG. 7. A tarp, rubber mat, or other cover as depicted by the dashed lines 19A may be placed over the grate 18A so as to prevent water and debris from entering the chamber 16A when the grain storage pit 10A is not being loaded with grain. The curved upper surface of the grate 18A keeps the cover 19A from drooping in the middle and prevents water from pooling on top of the cover and the grain pit.

An embodiment of the grate 18A presents a front edge 21A, a rear edge 23A, a left edge 25A, and a right side edge 27A as best shown in FIG. 6. The grate 18A may be formed from a number of elongated supports 30A and a plurality of cross treads 32A. The supports 30A are triangular in cross section as shown in FIG. 7 and formed of 0.1875" thick steel or other metal. The triangular shape of the supports provides sloped walls 34A that slow the flow of grain into the pit to prevent damage to the grain. In one embodiment, the sloped walls 34A of each support are approximately 11" long and connected at their lower ends by a base that is approximately 6" wide.

The supports 30A extend lengthwise between the left and right sides 25A, 27A of the grate 18A and are longer than the chamber 16A so that the ends of the supports extend beyond the chamber for supporting the pit during installation. For a 10'×10' chamber, the supports are approximately 13' long. Any number of supports may be provided, depending on the size of the chamber 16A and anticipated load on the grate 18A.

The portions of the supports 30A inside the boundaries of the chamber 16A are notched to receive and support the cross treads 32A. In one embodiment, the notches are spaced approximately 3" apart and are approximately 2" deep.

To provide for the convex-shaped upper surface of the grate 18A, the support in the middle of the grate 18A is taller and/or mounted higher than the supports nearer the ends of the grate as best shown in FIG. 7. In one embodiment, the top of the middle support is approximately ½-3" higher than the tops of the end supports. Alternatively the notches in the middle supports may be shallower to raise the midpoints of the cross treads 30A.

The cross treads 32A are aligned in the notches of the supports 30A and extend perpendicular to the supports. The cross treads 32A may be formed from elongated steel slats or bars, and in one embodiment are approximately 4" tall and 10' long. The cross treads 32 may extend above the apexes of the supports 30 by an inch or two to provide additional surface area for resisting the flow of grain into the pit.

Each of the cross treads 32A are curved or arched so that the centers of the cross treads are mounted at a higher elevation than the ends of the treads. Thus, the supports 30A and the cross treads 32A cooperatively define a convex upper surface that is highest near the center of the grate 18A and that slopes downwardly toward the front and rear edges 21A, 23A. This prevents the tarp or other cover 19A placed over the grate 18A from drooping and pooling water. The supports 30A and cross treads 32A may alternatively curve or slope between the left and right side edges 25A, 27A of the grates or even slope in all directions to form a dome-shaped upper surface.

In accordance with another important aspect of the grain storage pit 10A, its unloading port 20A is adjustable so it can be positioned on any side of the chamber 10A. An embodiment of the unloading port 20A may include an elongated tube 29A and a grain collection box 31A. The tube 29A has a lower end connected to the grain collection box 31A and an opposite end that extends above the grate. The grain collection box 31A is pivotally coupled with an opening in the bottom of the chamber by a circular flange 33A on the collection box that bolts to a corresponding circular flange 35A on the bottom of the chamber. The two circular flanges include a number of connection slots 37A that may be aligned to receive bolts or other fasteners to securely and fixedly attach the connection box 31A and the elongated tube 29A to the chamber. Advantageously, the flanges 33A, 35A may be pivoted or rotated relative to one another when the bolts between the flanges are loosened. This permits the unloading port 20A to be pivoted or rotated relative to the chamber 16A so that the end of the tube that extends above the grate may be positioned on any side of the pit and point in any desired direction.

The adjustable unloading port is particularly useful when two or more grain pits 10A are installed side-by-side or end to end as shown in FIG. 5. The adjustable unloading port 20A of each pit may be oriented so as to point toward the unloading port of the other pit. This permits augers to simultaneously remove grain from both of the pits and to deposit the grain into a single conveyor leg positioned between and above the grain pits.

Although the invention has been described with reference to the embodiment illustrated in the attached drawing figures, it is noted that equivalents may be employed and substitutions made herein without departing from the scope of the invention as recited in the claims. For example, although specific installation options are discussed herein, the storage pits 10 and 10A may be installed in other manners without departing from the scope of the invention.

Having thus described the preferred embodiment of the invention, what is claimed as new and desired to be protected by Letters Patent includes the following:

1. A grain storage pit comprising:
    an open-top chamber configured to be substantially flush-mounted in a surface, the open-top chamber comprising:
        a number of generally vertically-extending sidewalls;
        a number of inwardly-sloping bottom walls depending from the vertically-extending sidewalls to define a lower collection area;
        an upper circumferential lip extending outwardly from a top margin of the vertically-extending sidewalls;
    a grain-receiving grate that covers at least a portion of the open-top chamber so that grain may be poured into the open-top chamber through the grate, the grate comprising:
        a plurality of spaced-apart supports; and
        a plurality of cross treads supported by the supports, the supports having notches for receiving the cross treads, and the cross treads extending above the supports, extending at least a width of the chamber, and being supported by the supports from underneath and sufficiently rigid and close to each other to cooperatively support a wheel of a loaded vehicle,
    the grate having a convex-shaped upper surface for permitting a cover placed over the grate to more effectively shed water; and
    at least one unloading port in communication with an interior portion of the open-top chamber for facilitating removal of grain from the pit.

2. The grain storage pit as set forth in claim 1, wherein the unloading port is an unloading tube having one end in communication with the interior portion of the open-top chamber and an opposite end that extends above the grain-receiving grate.

3. The grain storage pit as set forth in claim 2 wherein the unloading tube is sized and configured for receiving an auger for removing the grain from the open-top chamber.

4. The grain storage pit as set forth in claim 1, wherein the unloading port is adjustably mounted to the open-top chamber so that it may be selectively positioned relative to the chamber.

5. The grain storage pit as set forth in claim 1, wherein the unloading port comprises an opening in the collection area for discharging the grain into a truck below the pit.

6. The grain storage pit of claim 1, further comprising
structure for adjustably mounting the unloading port to an opening in the open-top chamber so that the unloading port may be selectively angled at one of a plurality of substantially horizontally related orientations.

7. The grain storage pit as set forth in claim 6, wherein the grain pit includes four sides, the unloading port extending from a different side of the grain storage pit in at least two of the plurality of orientations.

8. The grain storage pit as set forth in claim 1, wherein the unloading port is an unloading tube having one end in communication with the interior portion of the open-top chamber and an opposite end that extends above the grain-receiving grate.

9. The grain storage pit as set forth in claim 8, wherein the unloading tube is sized and configured for receiving an auger for removing the grain from the open-top chamber.

10. The grain storage pit as set forth in claim 1, further comprising a cover for covering the grate when grain is not being loaded in the grain storage pit.

11. The grain storage pit as set forth in claim 1, wherein the plurality of spaced-apart supports includes a first support and at least one support on either side of the first support, the top of the first support being slightly higher than the tops of the at least one support on either side of the first support.

12. The grain storage pit as set forth in claim 11, wherein the first support is taller than the at least one support on either side of the first support.

13. The grain storage pit as set forth in claim 11, wherein the first support is mounted higher than the at least one support on either side of the first support.

14. The grain storage pit as set forth in claim 11, wherein the notches of the first support are shallower than the notches of the supports on either side of the first support.

15. The grain storage pit as set forth in claim 11, wherein the top of the first support is between approximately 0.5 inches to approximately 3 inches higher than the tops of the at least one support on either side of the first support.

16. The grain storage pit as set forth in claim 1, wherein the cross treads are curved such that the centers of the cross treads are positioned higher than the ends of the cross treads.

17. The grain storage pit as set forth in claim 1, wherein the cross treads are arched such that the centers of the cross treads are positioned higher than the ends of the cross treads.

18. The grain storage pit as set forth in claim 1, wherein the supports and the cross treads are sloped to form a dome-shaped upper surface.

19. A grain storage pit comprising:
an open-top chamber configured to be substantially flush-mounted in a surface, the open-top chamber comprising:
a number of generally vertically-extending sidewalls;
a number of inwardly-sloping bottom walls depending from the vertically-extending sidewalls to define a lower collection area;
an upper circumferential lip extending outwardly from a top margin of the vertically-extending sidewalls;
a grain-receiving grate that covers at least a portion of the open-top chamber so that grain may be poured into the open-top chamber through the grate, the grate comprising:
a plurality of spaced-apart supports including a first support and at least one support on either side of the first support, the top of the first support being slightly higher than the tops of the at least one support on either side of the first support; and
a plurality of cross treads supported by the supports, the supports having notches for receiving the cross treads, and the cross treads extending above the supports, extending at least a width of the chamber, and being supported by the supports from underneath and sufficiently rigid and close to each other to cooperatively support a wheel of a loaded vehicle,
the grate having a convex-shaped upper surface for permitting a cover placed over the grate to more effectively shed water;
at least one unloading port in communication with an interior portion of the open-top chamber for facilitating removal of grain from the pit, the unloading port being adjustably mounted to the open-top chamber so that the unloading port may be selectively positioned relative to the open-top chamber; and
structure for adjustably mounting the unloading port to an opening in the open-top chamber so that the unloading port may be selectively angled at one of a plurality of substantially horizontally related orientations.

20. A grain storage pit comprising:
an open-top chamber configured to be substantially flush-mounted in a surface, the open-top chamber comprising:
four generally vertically-extending sidewalls extending at right angles to each other so as to create four sides;
a number of inwardly-sloping bottom walls depending from the vertically-extending sidewalls to define a lower collection area;
an upper circumferential lip extending outwardly from a top margin of the vertically-extending sidewalls;
a grain-receiving grate that covers at least a portion of the open-top chamber so that grain may be poured into the open-top chamber through the grate, the grate comprising:
a plurality of spaced-apart supports including a first support and at least one support on either side of the first support, the top of the first support being slightly higher than the tops of the at least one support on either side of the first support; and
a plurality of cross treads supported by the supports, the supports having notches for receiving the cross treads, and the cross treads extending above the supports, extending at least a width of the chamber, and being supported by the supports from underneath and sufficiently rigid and close to each other to cooperatively support a wheel of a loaded vehicle,
the grate having a convex-shaped upper surface for permitting a cover placed over the grate to more effectively shed water;
at least one unloading port in communication with an interior portion of the open-top chamber for facilitating removal of grain from the pit, the unloading port being adjustably mounted to the open-top chamber so that the unloading port may be selectively positioned relative to the open-top chamber; and structure for adjustably mounting the unloading port to an opening in the open-top chamber so that the unloading port may be selectively angled at one of a plurality of substantially horizontally related orientations near a different one of the four sides of the grain storage pit.

\* \* \* \* \*